US006966578B2

(12) United States Patent
Smith

(10) Patent No.: US 6,966,578 B2
(45) Date of Patent: Nov. 22, 2005

(54) ADAPTIVE OUTPUT, TOROIDAL-SHAPED PYROTECHNIC INFLATOR

(75) Inventor: Bradley W. Smith, Ogden, UT (US)

(73) Assignee: Autoliv ASP, Inc., Ogden, UT (US)

(*) Notice: Subject to any disclaimer, the term of this patent is extended or adjusted under 35 U.S.C. 154(b) by 251 days.

(21) Appl. No.: 10/350,444

(22) Filed: Jan. 24, 2003

(65) Prior Publication Data

US 2004/0145166 A1     Jul. 29, 2004

(51) Int. Cl.[7] ............................................. B60R 21/26
(52) U.S. Cl. ........................ 280/736; 280/741; 280/742
(58) Field of Search ................................ 280/741, 736, 280/742

(56) References Cited

U.S. PATENT DOCUMENTS

| | | |
|---|---|---|
| 4,006,919 A | 2/1977 | Neuman |
| 4,380,346 A | 4/1983 | Davis et al. |
| 5,069,478 A | 12/1991 | Kim |
| 5,195,777 A | 3/1993 | Cuevas |
| 5,269,561 A | 12/1993 | Davis et al. |
| 5,398,966 A | 3/1995 | Hock |
| 5,433,476 A | 7/1995 | Materna et al. |
| 5,551,724 A | 9/1996 | Armstrong, III et al. |
| 5,551,725 A | 9/1996 | Ludwig |
| 5,558,367 A | 9/1996 | Cuevas |
| 5,609,359 A | 3/1997 | Johnson et al. |
| 5,788,274 A | 8/1998 | Gunn |
| 5,803,494 A * | 9/1998 | Headley ..................... 280/741 |
| 5,851,027 A | 12/1998 | DiGiacomo et al. |
| 5,951,040 A | 9/1999 | McFarland et al. |
| 5,992,881 A | 11/1999 | Faigle |
| 6,007,097 A | 12/1999 | Rink et al. |
| 6,029,995 A | 2/2000 | Fink |
| 6,074,502 A | 6/2000 | Burns et al. |
| 6,103,030 A | 8/2000 | Taylor et al. |
| 6,120,058 A | 9/2000 | Mangum et al. |

(Continued)

FOREIGN PATENT DOCUMENTS

DE          2 046 515          9/1978

(Continued)

*Primary Examiner*—Eric Culbreth
(74) *Attorney, Agent, or Firm*—Sally J. Brown

(57) ABSTRACT

A toroidal-shaped adaptive output inflator is provided wherein the inflator includes an outer housing and an inner housing together defining an outer chamber and an inner chamber. A supply of gas-generating pyrotechnic material having a burn rate that is pressure dependent is contained within the outer chamber and at least a portion of the supply of gas-generating pyrotechnic material is reactable to generate a product gas. The inflator also includes a first plurality of apertures and a second plurality of apertures each formed in the inner housing, and each providing independent fluidic communication between the outer chamber and the inner chamber wherethrough at least a portion of the product gas can exit the outer chamber into the inner chamber. An output control device positioned within the inner chamber is movable or rotatable between a first or open position allowing fluidic communication between the outer chamber and the inner chamber through the first plurality of apertures and the second plurality of apertures, and a second or closed position at least partially obstructing fluidic communication between the outer chamber and the inner chamber through at least one of the first plurality of apertures. Also provided is a control assembly in operational control communication with the inflator and associated or related methods for adjusting inflation gas output from the inflator.

22 Claims, 6 Drawing Sheets

U.S. PATENT DOCUMENTS

| | | |
|---|---|---|
| 6,131,948 A | 10/2000 | Cuevas |
| 6,176,518 B1 | 1/2001 | Faigle |
| 6,196,582 B1 | 3/2001 | Sparkman et al. |
| 6,237,950 B1 | 5/2001 | Cook et al. |
| 6,254,121 B1 | 7/2001 | Fowler et al. |
| 6,314,889 B1 | 11/2001 | Smith |

FOREIGN PATENT DOCUMENTS

| | | |
|---|---|---|
| GB | 2291495 | 1/1996 |
| GB | 2298912 | 9/1996 |
| JP | 08 332 912 | 12/1996 |
| WO | 91/34785 | 9/1997 |

* cited by examiner

ADAPTIVE OUTPUT, TOROIDAL-SHAPED PYROTECHNIC INFLATOR

BACKGROUND OF THE INVENTION

This invention relates generally to inflators such as for use in inflating inflatable restraint airbag cushions to provide impact protection to occupants of motor vehicles. More particularly, the invention relates to inflators which rely primarily on reaction of a combustible material for the production of an inflation gas and such as may provide an inflation gas output which is adaptive to factors such as one or more crash and occupant conditions.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

In general, the burn rate for a gas generant composition can be represented by the equation (1), below:

$$r_b = k(P)^n \quad (1)$$

where,
- $r_b$ = burn rate (linear)
- k = constant
- P = pressure
- n = pressure exponent, where the pressure exponent is the slope of a linear regression line drawn through a log-log plot of burn rate versus pressure.

As will be appreciated, the pressure exponent generally corresponds to the performance sensitivity of a respective gas generant material, with lower burn rate pressure exponents corresponding to gas generant materials which desirably exhibit corresponding lesser or reduced pressure sensitivity.

Typical pyrotechnic-based inflator devices commonly include or incorporate certain component parts including, for example: a pressure vessel wherein the pyrotechnic gas generating material is burned; various filter or inflation medium treatment devices to properly condition the inflation medium prior to passage into the associated airbag cushion and a diffuser to assist in the proper directing of the inflation medium into the associated airbag cushion.

To date, sodium azide has been a commonly accepted and used gas generating material. While the use of sodium azide and certain other azide-based gas generant materials meets current industry specifications, guidelines and standards, such use may involve or raise potential concerns such as involving handling, supply and disposal of such materials. Further, economic and design considerations have also resulted in a need and desire for alternatives to azide-based pyrotechnics and related gas generants. For example, interest in minimizing or at least reducing overall space requirements for inflatable restraint systems and particularly such requirements related to the inflator component of such systems has stimulated a quest for gas generant materials that provide relatively higher gas yields per unit volume as compared to typical or usual azide-based gas generants. Still further, automotive and airbag industry competition has generally lead to a desire for gas generant compositions that satisfy one or more conditions such as being composed of or utilizing less costly ingredients or materials and being amenable to processing via more efficient or less costly gas generant processing techniques.

As a result, the development and use of other suitable gas generant materials has been pursued. Through such efforts, various azide-free pyrotechnics have been developed for use in such inflator device applications including at least some that have or exhibit a relatively high burn rate pressure dependency, e.g., have a burn rate pressure exponent of 0.4 or more.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply (e.g., mass flow rate) of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device and such as may undesirably increase one or more of the size, cost and weight of the inflator device. For example, various proposed or currently available dual stage inflator devices appear based on the principal of packaging together two separate inflators. As a result, such inflator combinations commonly include two distinct pressure vessels, two sets of filter or inflation gas treatment components, one for the output of each of the pressure vessels, and two distinct diffusers, again one for the output of each of the pressure vessels. Thus, it has been difficult to provide an adaptive inflator which will satisfactorily meet the size, cost and weight limitations associated with modern vehicle design, particularly as it pertains to driver side applications.

Perhaps the simplest form of an adaptive inflation system is an inflation system which utilizes an inflator which provides two levels or stages of performance, e.g., commonly called or referred to as a "two-stage" or "dual stage" inflator. Those skilled in the art, however, appreciate that even a relatively simple two-stage inflator may require significantly sophisticated actuation and/or control systems, as compared to typical single stage inflators, in order to realize particularly desired adaptive performance capabilities.

In view of the above, there is a need and a demand for a combustible material-based adaptive performance inflator device of desirably simple design and construction. In particular, there is a need and a demand for such an adaptive performance inflator device which more freely permits the use of azide-free pyrotechnics, such as those that have or exhibit a relatively high burn rate pressure dependency, e.g., a burn rate pressure exponent of 0.4 or more. Further, there is a need and a demand for adaptive performance inflatable restraint assembly combinations that are conducive for use in conjunction with relatively simple control arrangements.

Still further, while current trends and developments have focused to a large extent on the development and incorporation of various adaptive performance restraint installations, a large proportion and number of earlier inflatable restraint installations made use of traditional inflatable restraint assemblies. Thus, there is a need and a demand for an adaptive performance inflatable restraint assembly combination such as may, if desired, be used in a retrofit fashion within various existing inflatable restraint installations.

Commonly assigned, U.S. Pat. No. 6,314,889 issued to Smith, the disclosure of which patent is hereby incorporated by reference herein and made a part hereof, has been developed, at least in part, in response to such needs and demands. This patent discloses an adaptive output pyrotechnic inflator device and control assembly combination wherein the inflator device includes a first chamber wherein a supply of a combustible gas generant material having a burn rate which is pressure dependent is burned to produce gas. The inflator device also includes an exit of adjustable cross sectional area in fluid communication with the first chamber and wherethrough at least a portion of the product gas can exit the inflator device. The control assembly is in operational control communication with the inflator device and provides a control signal to the inflator device to effect adjustment of the cross sectional area of the exit dependent on at least one chosen product gas output performance factor.

While such an inflator device and control assembly combination has been successful in overcoming, at least in part, some of the shortcomings of prior assemblies, further improvements and developments are desired and have been sought. In particular, there is a need and a demand for a toroidal-shaped adaptive output inflator which can successfully overcome or minimize some or all of the above-identified shortcoming or limitations.

SUMMARY OF THE INVENTION

A general object of the invention is to provide an improved inflator and associated or corresponding methods of inflation gas supply.

A more specific objective of the invention is to overcome one or more of the problems described above.

The general object of the invention can be attained, at least in part, through a toroidal-shaped adaptive output inflator that includes an outer housing and an inner housing connected to the outer housing, together defining an outer chamber and an inner chamber. A supply of gas-generating pyrotechnic material having a burn rate which is pressure dependent is contained within the outer chamber and is reactable to produce a product gas. A primary initiator is in discharge communication with the outer chamber and in operational initiation communication with the supply of gas-generating pyrotechnic material. The inflator also includes a first plurality of apertures and a second plurality of apertures each formed in the inner housing and each providing independent fluidic communication between the outer chamber and the inner chamber wherethrough at least a portion of the product gas can exit the outer chamber. An output control device is movable between a first position allowing fluidic communication between the outer chamber and the inner chamber through the first plurality of apertures and the second plurality of apertures, and a second position at least partially obstructing fluidic communication between the outer chamber and the inner chamber through at least one of the first plurality of apertures.

In accordance with a preferred practice of the invention, variability in inflator output is achieved through change in combustion pressure such as resulting from the at least partial obstruction of fluidic communication between the outer chamber and the inner chamber through the first plurality of apertures. Since the burn rate of the gas generant material, e.g., pyrotechnic, is dependent on pressure, changes in combustion pressure correspondingly change the generant burn rate, thus varying the inflator output, e.g., mass flow rate. For example, obstructing the fluidic communication through the first plurality of apertures whereby decreasing the outer chamber exit area raises the combustion pressure which, in turn, raises the generant burn rate which increases the mass flow rate from the inflator. Correspondingly, allowing fluidic communication through the first plurality of apertures whereby increasing the outer chamber exit area reduces the combustion pressure which, in turn, reduces the generant burn rate which decreases the mass flow rate from the inflator. Such performance behavior is opposite to that of prior art inflators such as certain stored gas inflators that incorporate an adjustable exit area. In particular, such prior art inflators typically experience a reduction in mass flow rate from the inflator with a reduction in exit area and an increase in mass flow rate from the inflator with an increase in exit.

The prior art generally fails to provide adaptive performance inflator devices of desirably simple design and construction. In particular, the prior art fails to provide such an adaptive performance inflator device which relies largely or primarily on the reaction of a combustible material, e.g., a pyrotechnic, especially such as various azide-free pyrotechnics that have or exhibit a relatively high burn rate pressure dependency, to form or produce inflation gas. Further, the prior art generally fails to provide adaptive performance inflatable restraint assembly combinations that are conducive for use in conjunction with relatively simple control arrangements and such as may, if desired, be used in a retrofit fashion within existing inflatable restraint installations.

In accordance with another preferred embodiment, the invention comprehends a combination that includes a toroidal-shaped adaptive output inflator and a control assembly in operation control communication with the inflator. The toroidal-shaped adaptive output inflator includes an outer housing and an inner housing and contains a supply of gas-generating pyrotechnic material having a burn rate that is pressure dependent and reactable to produce a product gas. The inflator also includes a first plurality of apertures and a second plurality of apertures each providing independent fluidic communication between an outer chamber and an inner chamber defined by the inflator, wherethrough at least a portion of the product gas can exit the outer chamber into the inner chamber.

The control assembly is in operational control communication with the inflator and provides a reaction initiating signal to a primary initiator to initiate reaction of at least a portion of the supply of gas-generating pyrotechnic material and a control signal to effect movement of an output control device between a first position allowing fluidic communication between the outer chamber and the inner chamber through the first plurality of apertures and the second plurality of apertures, and a second position at least partially obstructing fluidic communication between the outer chamber and the inner chamber through at least one of the first plurality of apertures.

The invention still further comprehends a method for adaptively adjusting a mass flow rate of a product gas by controlling an internal pressure in a toroidal-shaped inflator that includes an outer housing and an inner housing connected to the outer housing, together defining an outer chamber and an inner chamber. A supply of gas-generating pyrotechnic material is contained within the outer chamber having a burn rate that is pressure dependent, at least a portion of the supply of gas-generating pyrotechnic material reactable to produce a product gas. In accordance with one preferred embodiment of the invention, such a method involves at least partially selectively obstructing fluidic communication between the outer chamber and the inner chamber through at least one of a first plurality of apertures and a second plurality of apertures formed in the inner housing, each providing independent fluidic communication between the outer chamber and the inner chamber. For example, the fluidic communication between the outer chamber and the inner chamber may be adjustable in response to receipt of a control signal from an associated control assembly, the control signal being dependent on at least one chosen product gas output performance factor for the device.

As used herein, references to the detection or sensing of "occupant presence" are to be understood to refer to and include detection and/or sensing of size, weight, and/or position of an occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

Further, references herein to a combustible gas generant material, e.g., a pyrotechnic, having a burn rate which is "pressure dependent" are to be understood to refer to those combustible gas generant materials having a relatively high burn rate pressure dependency. In the context of the invention, such a relatively high burn rate pressure dependency is generally signified by a burn rate pressure exponent of at least about 0.4, preferably by a burn rate pressure exponent of at least about 0.5 and, more preferably, by a burn rate pressure exponent in the range of at least about 0.55 to about 0.60.

Other objects and advantages will be apparent to those skilled in the art from the following detailed description taken in conjunction with the appended claims and drawings.

DETAILED DESCRIPTION OF THE INVENTION

Figure 1:
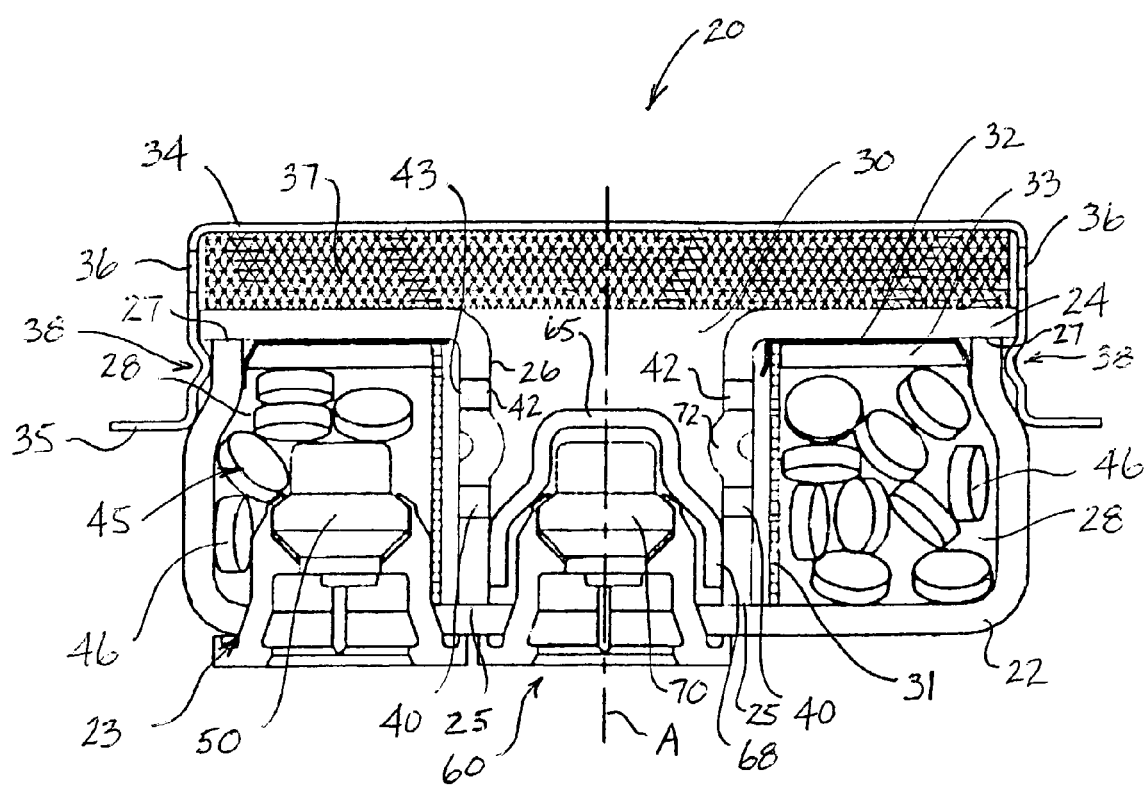
FIG. 1 is a partially in section, schematic drawing of an inflator in accordance with one preferred embodiment of the invention.

The present invention provides a toroidal-shaped adaptive output inflator 20 forming an outer housing 22. The term "toroidal" refers to a body or an element of the inflator 20 having a generally conventional doughnut shape. An inner housing 24 is connected to or mounted within the outer housing 22 and together the outer housing 22 and the inner housing 24 define or otherwise form or include an outer chamber 28 and an inner chamber 30. Preferably, the outer housing 22 is welded to the inner housing 24 at locations 25 and 27 by friction welding or other suitable weld techniques. As shown in FIG. 1, the outer housing 22 and the inner housing 24 each is generally concentrically centered along an axis, designated by the reference character A, with the outer housing 22 generally radially surrounding the inner housing 24. Referring for example to FIG. 1, the inner housing 24 forms a cylindrical wall 26 that is generally centered along axis A. The cylindrical wall 26 includes a plurality of apertures wherethrough inflation fluid, e.g., formed, produced or otherwise provided by the outer chamber 28 can be properly discharged from the outer chamber 28, such as into the inner chamber 30. For example, as shown, the inner housing 24 may include apertures in the form of or constituting a first plurality of apertures 40 and a second plurality of apertures 42, each providing independent fluidic communication between the outer chamber 28 and the inner chamber 30. Because the first plurality of apertures 40 and the second plurality of apertures 42 provide independent fluidic communication between the outer chamber 28 and the inner chamber 30, inflation fluid, e.g., inflation gas, can flow through only the first plurality of apertures 40, only the second plurality of apertures 42, or both the first plurality of apertures 40 and the second plurality of apertures 42, depending upon the inflator performance arrangement.

In one embodiment of the invention, the first plurality of apertures 40 and the second plurality of apertures 42 may each be positioned generally in a row about the cylindrical wall 26. Further, the first plurality of apertures 40 and the second plurality of apertures 42 may each form independent fluidic communication channels (not shown) between the outer chamber 28 and the inner chamber 30. With the inflator 20 in a static or inactivated state as shown in FIG. 1, each of the first plurality of apertures 40 and each of the second plurality of apertures 42 may be covered or closed with a barrier foil 43 to prevent fluid communication between the outer chamber 28 and the inner chamber 30 and maintain a supply of gas-generating pyrotechnic material 45 at a steady state, e.g., isolated from moisture.

A diffuser 34 is positioned or disposed relative to the inner and outer housing assembly and securely connected thereto. Preferably, the diffuser 34 is connected to the outer housing 22 by welding or more preferably, the diffuser 34 is connected by crimping over the protruding portion of the inner housing 24 at location 38 as shown in FIG. 1 for example. The diffuser 34 may include a mounting flange 35 for mounting the inflator assembly within a vehicle. The diffuser 34 includes a plurality of exit openings or channels, generally designated by the reference number 36 wherethrough inflation fluid, e.g., inflation gas, formed, produced or otherwise discharged by the inflator 20 can be properly discharged into communication with an associated inflatable device (not shown). Additionally, a cooling pack 37 and/or any suitable gas treatment element may be positioned or disposed within the diffuser 34 and positioned between the exit openings 36 and the inner housing 24, as shown for example in FIG. 1, such that at least a portion of the inflation gas exiting the inflator 20 through exit openings 36 moves or flows through the cooling pack 37. The cooling pack 37 and/or suitable gas treatment element can be included to serve as a heat sink effective to reduce the temperature of the inflation fluid passing therethrough, prior to discharge of such inflation fluid from the inflator 20. Alternatively or in addition, the cooling pack 37 and/or suitable gas treatment element may be included or serve to filter or otherwise remove particulates from the inflation fluid passing therethrough.

A supply of gas-generating pyrotechnic material 45 is positioned or contained within the outer chamber 28. At least a portion of the supply of gas-generating pyrotechnic material 45 is reactable or combustible to generate a product gas. Preferably, the supply of gas-generating pyrotechnic material 45 has a burn rate that is pressure dependent. The outer chamber 28 is shown as containing or including a selected supply of gas-generant pyrotechnic material 45 such as in the form of a plurality of pellets or discs 46. While the invention may, if desired, be practiced employing various gas generant materials, as are known in the art, the invention has particular perceived utility when used in conjunction with those gas generant materials, e.g., pyrotechnics, which have or exhibit a relatively high burn rate pressure dependency, e.g., have a burn rate pressure exponent of 0.4 or more. As identified above, such gas generant materials include various newly developed azide-free pyrotechnics. The metal ammine nitrate-containing azide-free gas generant compositions disclosed in U.S. Pat. No. 6,103,030, issued Aug. 15, 2000, the disclosure of which is fully incorporated herein by reference, are an example of one preferred form of an azide-free gas generant composition having such a high burn rate pressure dependency for use in the practice of the invention. As disclosed in that patent, one particularly preferred gas generant composition in accordance therewith includes: between about 35 and about 50 wt % of guanidine nitrate fuel, between about 30 and about 55 wt % copper diammine dinitrate oxidizer, between about 2 and about 10 wt % silicon dioxide burn rate enhancing and slag formation additive, and between about 0 and about 25 wt % ammonium nitrate supplemental oxidizer. As the burn rate of such pyrotechnic gas generant materials is a strong function of pressure, higher combustion pressures can produce or result in higher mass flow rates of produced or formed gases. Correspondingly, with such pyrotechnic gas generant materials, lower combustion pressures can produce or result in lower mass flow rates of produced or formed gases.

The inflator 20 may also include a strainer 31 positioned within the outer chamber 28 and adjacent apertures 40, 42 providing fluidic communication between the outer chamber 28 and the inner chamber 30. The strainer 31 is maintained or secured within the outer chamber 28 by a retainer disc 32.

The strainer 31 entraps particulates produced as a by-product of combustion of the gas-generating pyrotechnic material 45, as the product gas exits the outer chamber 28 into the inner chamber 30. Additionally, a damper pad 33 may be positioned on an inner surface of the retainer disc 32 for dampening purposes to minimize movement of the pyrotechnic material 45 due to shock or vibration during the inflator's service life.

As shown in FIG. 1 for example, at least one primary initiator 50 is in discharge communication with the outer chamber 28, and in operational initiation communication with the supply of gas-generating pyrotechnic material 45. Preferably, the primary initiator 50 is seated or positioned relative to the outer housing 22 and extends into the outer chamber 28. The primary initiator 50 can be variously joined or secured with or to the outer housing 22. For example, the outer housing 22 includes an opening 23 such as to permit passage therethrough of an initiation discharge from the primary initiator 50 and into communication with the supply of gas-generating pyrotechnic material 45 contained within the outer chamber 28. Activation of the primary initiator 50, as explained in greater detail below, initiates the combustion of at least a portion of the supply of gas-generating pyrotechnic material 45 to produce a product gas, which exits the outer chamber 28 through at least one of the first plurality of apertures 40 and the second plurality of apertures 42 into the inner chamber 30.

The inflator 20 includes an output control device 60 that is movable between a first or open position allowing fluidic communication between the outer chamber 28 and the inner chamber 30 through the first plurality of apertures 40 and the second plurality of apertures 42, and a second or closed position at least partially obstructing fluidic communication between the outer chamber 28 and the inner chamber 30 through at least one of the first plurality of apertures 40.

Figure 2:
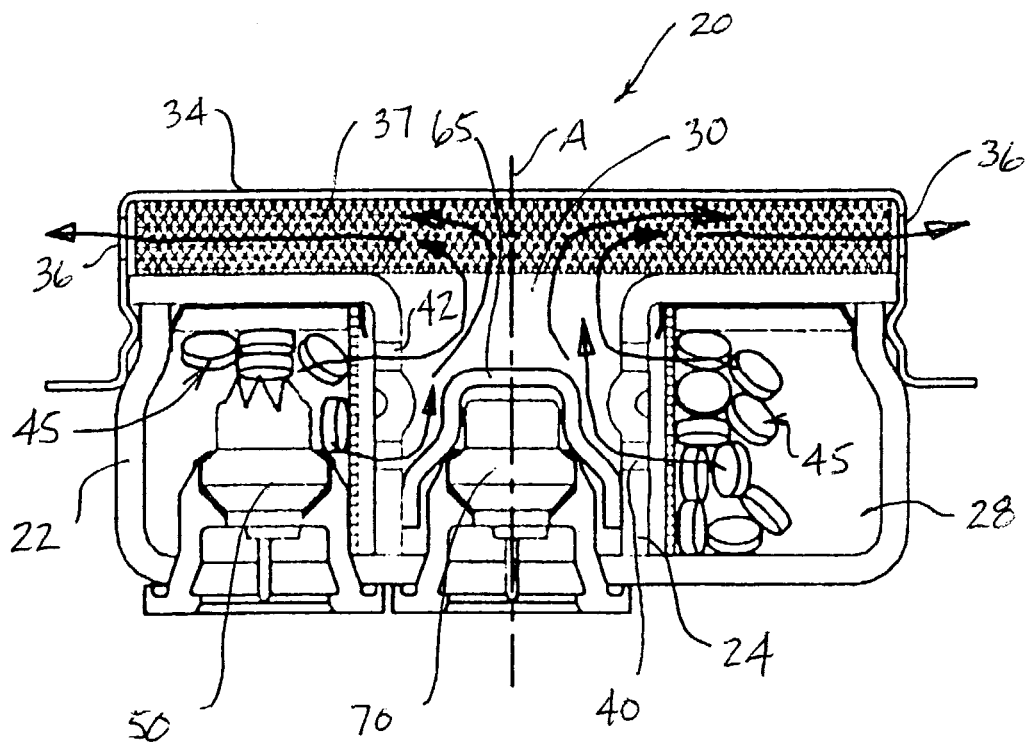
FIG. 2 is a partially in section, schematic drawing of the inflator shown in FIG. 1 but now showing the directional flow of product gas through the inflator in a low rise rate (low mass flow rate) performance arrangement.
Figure 3:
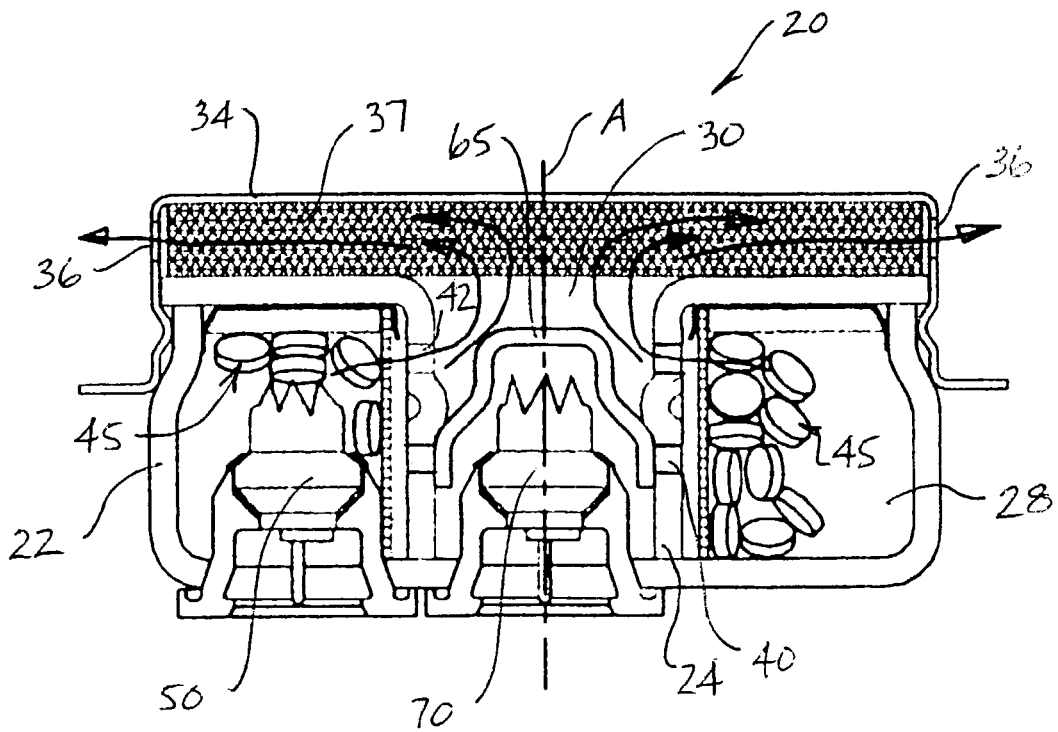
FIG. 3 is a partially in section, schematic drawing of the inflator shown in FIG. 1 but now showing the directional flow of product gas through the inflator in a high rise rate (high mass flow rate) performance arrangement.

Referring to FIGS. 1–3, in one preferred embodiment of the invention, the output control device 60 includes a piston or control cup 65 positioned within the inner chamber 30. The inflator 20 in FIG. 1 generally shows the inflator 20 in static state, wherein the primary initiator 50 has not been activated to initiate the combustion of the supply of gas-generating pyrotechnic material 45. FIG. 2 generally represents the inflator 20 of FIG. 1 in a low rise rate (low mass flow rate) performance arrangement and FIG. 3 generally represents the inflator 20 of FIG. 1 in a high rise rate (high mass flow rate) performance arrangement. The control cup 65 generally forms a cylindrical sidewall 68 that contacts at least a portion of the cylindrical wall 26 of inner housing 24, without undesirably preventing or restricting movement of the control cup 65 with respect to the inner housing 24. A control initiator 70 is disposed or positioned relative to the control cup 65 and in discharge communication with the control cup 65 to effect movement of the control cup 65 between the first position representing the low rise rate (low mass flow rate) performance arrangement (FIG. 2) and the second position representing the high rise rate (high mass flow rate) performance arrangement (FIG. 3). With the control cup 65 in the first position, the control cup 65 generally rests or is seated on the control initiator 70 to allow fluidic communication between the outer chamber 28 and the inner chamber 30 through the first plurality of apertures 40 and the second plurality of apertures 42, as shown in FIG. 2.

Upon activation of the control initiator 70, the control initiator 70 discharges or causes the control cup 65 to move in a direction generally along axis A to the second position wherein at least a portion of the control cup 65, such as the cylindrical sidewall 68, contacts the cylindrical wall 26 of the inner housing 24 to prevent or at least partially obstruct fluidic communication between the outer chamber 28 and the inner chamber 30 through the first plurality of apertures 40. The cylindrical wall 26 may form or include at least one interfering projection 72 that prevents or limits further movement of the control cup 65 in a direction generally along axis A with the control cup 65 in the second position, as shown in FIG. 3.

The primary initiator 50 is activated by a control assembly in operational control communication with the inflator 20. A suitable control assembly is described in detail below in reference to FIGS. 8 and 9. The control assembly provides a reaction initiating signal to the primary initiator 50 to initiate reaction of at least a portion of the supply of gas-generating pyrotechnic material 45. The control assembly may also provide a control signal to effect movement of the output control device 60 between the first position and the second position. For example in one embodiment, the control assembly provides a control signal to the control initiator 70 to effect movement of the control cup 65 positioned within the inner chamber 30 from the first position to the second position at least partially obstructing fluidic communication between the outer chamber 28 and the inner chamber 30 through at least one of the first plurality of apertures 40.

The inflator 20 is shown in FIG. 1 in a static state whereby the first plurality of apertures 40 and the second plurality of apertures 42 each is open to permit the passage of the inflation fluid therethrough upon actuation. FIG. 2 illustrates the inflator 20 after actuation of the primary initiator 50.

As shown, actuation of the primary initiator 50 results in the passage of an initiating discharge into contact with the supply of gas-generating pyrotechnic material 45 contained within the outer chamber 28 to effect ignition of the supply of gas-generating pyrotechnic material 45. Such ignition will result in combustion of at least a portion of the supply of gas-generating pyrotechnic material 45 and an increase in pressure within the outer chamber 28. When the pressure within the outer chamber 28 is sufficiently increased, the barrier foil 43 adjacent to and covering each of the first plurality of apertures 40 and each of the second plurality of apertures 42 will rupture or otherwise open to permit passage therethrough of the combustion products. With such passage, the combustion products are passed into the inner chamber 30 and into contact with the cooling pack 37 therein contained, and subsequently out of the inflator 20 through one or more of the outer housing exit openings 36. Such an arrangement is sometimes referred to herein as a "low rise rate" ("low mass flow rate") performance arrangement.

Actuation of the control initiator 70 directs a discharge at or otherwise produces or results in the separation or release of the control cup 65 from an initial or first position generally seated on the control initiator 70, as shown in FIG. 3. With such separation or release, the control cup 65 moves in a direction generally along axis A to the second position wherein the sidewall 68 of the control cup 65 covers at least a portion of at least one of the first plurality of apertures 40 to at least partially obstruct fluidic communication between the outer chamber 28 and the inner chamber 30 through the first plurality of apertures 40. As a result of such at least partial obstruction or blockage of at least one of the first plurality of apertures 40, the pressure within the outer chamber 28 increases or becomes greater, thereby increasing the burn rate of the gas-generating pyrotechnic material 45 and resulting in an increase in the mass flow rate of the product gas through the second plurality of apertures 42.

Thus, when the invention is practiced employing gas generant materials, e.g., pyrotechnics, which have or exhibit a relatively high burn rate pressure dependency, e.g., have a burn rate pressure exponent of 0.4 or more, such as identified above, such higher combustion pressures can produce or result in higher mass flow rates of produced or formed gases. Consequently, such an arrangement is sometimes referred to herein as a "high rise rate" ("high mass flow rate") performance arrangement.

As will be appreciated by those skilled in the art and guided by the teachings herein provided, the adjustment of the fluidic communication between the outer chamber 28 and the inner chamber 30, and ultimately the adjustment of output product gas exiting the inflator 20, such as in response to one or more crash and occupant conditions, can be selected dependent on at least one chosen product gas output performance factor, including, inflation gas mass flow rate and temperature, for example.

While the invention has been described above (FIGS. 1–3 for example) relative to the inflator 20 wherein the control cup 65 is one-time releasably secured to normally permit product gas flow through the first plurality of apertures 40 and, upon release, to limit product gas flow through the first plurality of apertures 40, the broader practice of the invention is not necessarily so limited. For example, the invention can, if desired, be practiced employing an inflator device wherein the fluidic communication within the inflator device can be adjusted more than one time.

FIGS. 4–7 illustrate one such multiple adjustment inflator 120 in accordance with an alternate preferred embodiment of the invention under selected conditions of activation.

Figure 4:
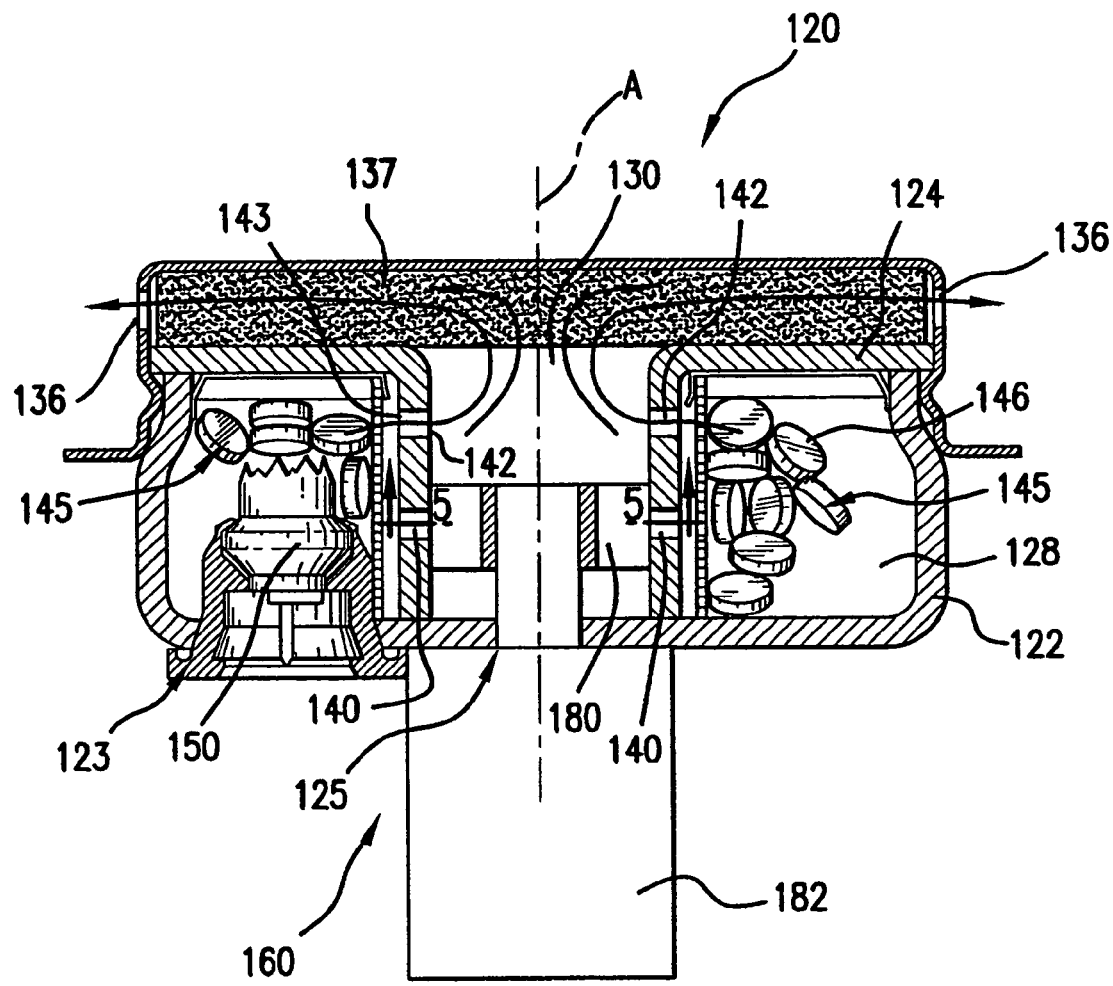
FIG. 4 is a partially in section, schematic drawing of an inflator in accordance with another preferred embodiment of the invention showing the directional flow of product gas through the inflator in a low rise rate (low mass flow rate) performance arrangement.

Referring to FIG. 4 for example, the inflator 120 is shown in a low rise rate (e.g., a low inflation gas mass flow rate) performance arrangement. The inflator 120 includes an outer chamber 128 and an inner chamber 130, similar to the inflator 20 described above. The outer chamber 128 is at least partially defined by a an outer housing 122 and an inner housing 124 connected to the outer housing 122. The outer housing 122 and the inner housing each is generally concentrically centered along an axis, designated by the reference character A, with the outer housing 122 generally radially surrounding the inner housing 124.

As in the above-described embodiment, the outer housing 122 forms or includes an opening 123 in which is received a primary initiator 150. The outer chamber 128 desirably contains a gas-generating pyrotechnic material 145, e.g., a pyrotechnic, which has or exhibits a relatively high burn rate pressure dependency, e.g., has a burn rate pressure exponent of 0.4 or more, such as in the form of pellets or discs 146. As shown in FIG. 4 for example, a primary initiator 150 is in discharge communication with the outer chamber 128, and in operational initiation communication with the supply of gas-generating pyrotechnic material 145. Preferably, the primary initiator 150 is seated or positioned relative to the outer housing 122 and extends into the outer chamber 128. The primary initiator 150 can be variously joined or secured with or to the outer housing 122. For example, the outer housing 122 includes an opening 123 such as to permit passage therethrough of an initiation discharge from the primary initiator 150 and into communication with the supply of gas-generating pyrotechnic material 145 contained within the outer chamber 128. Activation of the primary initiator 150 initiates the combustion of at least a portion of the supply of gas-generating pyrotechnic material 145 to produce a product gas, which exits the outer chamber 128 through at least one of the first plurality of apertures 140 and the second plurality of apertures 142 into the inner chamber 130.

The outer housing 122 forms or includes an opening 125 in which is received a rotor valve 180, which is operatively joined or connected to a solenoid device 182. Preferably, the solenoid device 182 is disposed or positioned relative to the rotor valve 180 and in operation communication with the rotor valve 180 to effect rotation of the rotor valve 180 between the open position representing the low rise rate (low mass flow rate) performance arrangement (FIGS. 4 and 5) and the closed position representing the high rise rate (high mass flow rate) performance arrangement (FIGS. 6 and 7).

The inflator 120 includes a plurality of apertures, for example a first plurality of apertures 140 and a second plurality of apertures 142 wherethrough inflation fluid, e.g., inflation gas, formed, produced or otherwise provided by the outer chamber 128 can be properly discharged from the outer chamber 128 such as into the inner chamber 130. For example, and as shown, such first plurality of apertures 140 and second plurality of apertures 142 may be in the form or constitute a first row of apertures 140 and a second row of apertures 142, respectively.

Figure 5:
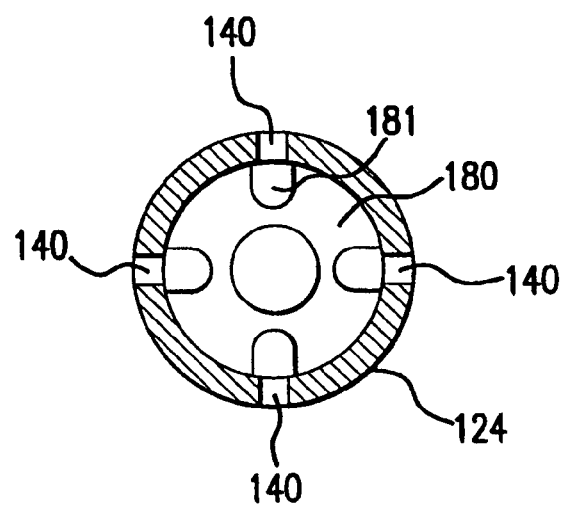
FIG. 5 is a partially in section, schematic drawing of the inflator shown in FIG. 4, taken substantially along the line 5—5 shown in FIG. 4.
Figure 6:
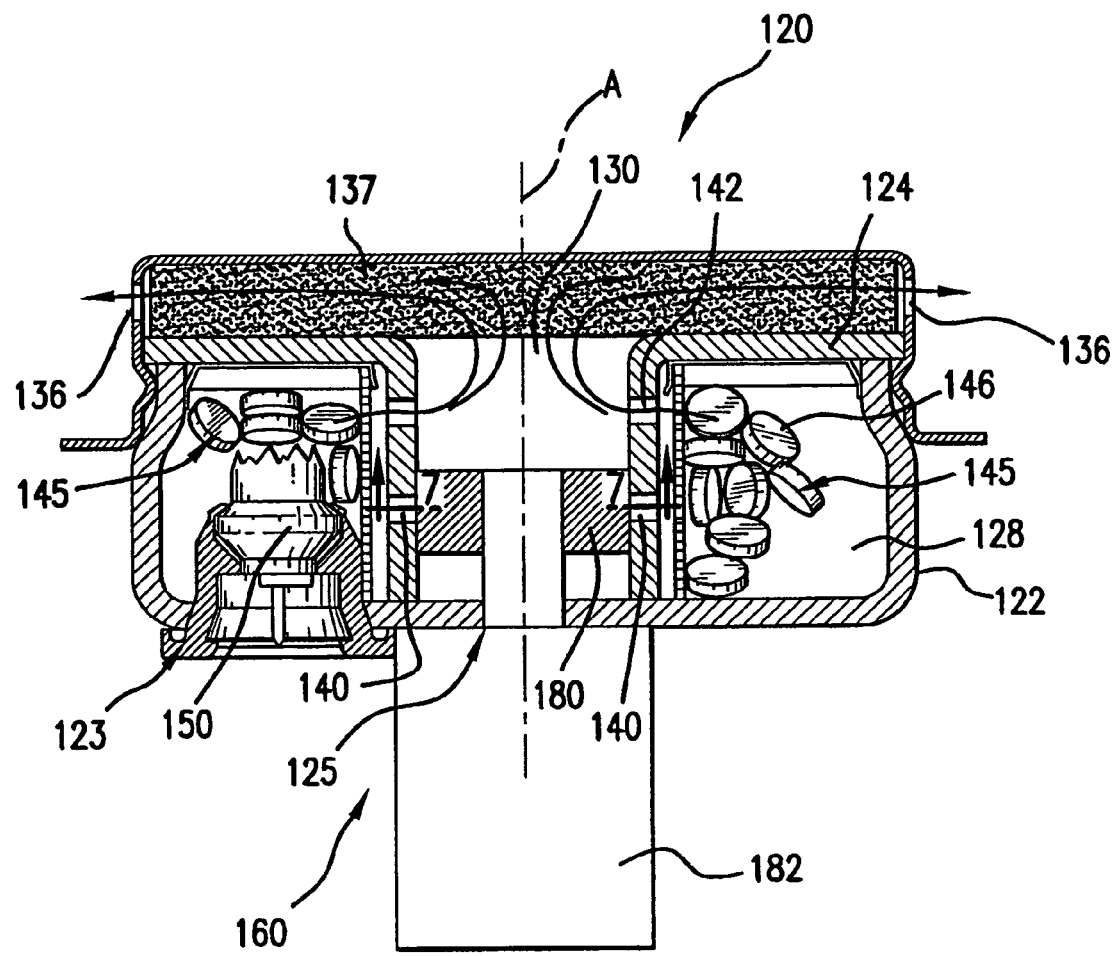
FIG. 6 is a partially in section, schematic drawing of the inflator shown in FIG. 4 but now showing the directional flow of product gas through the inflator in a high rise rate (high mass flow rate) performance arrangement.
Figure 7:
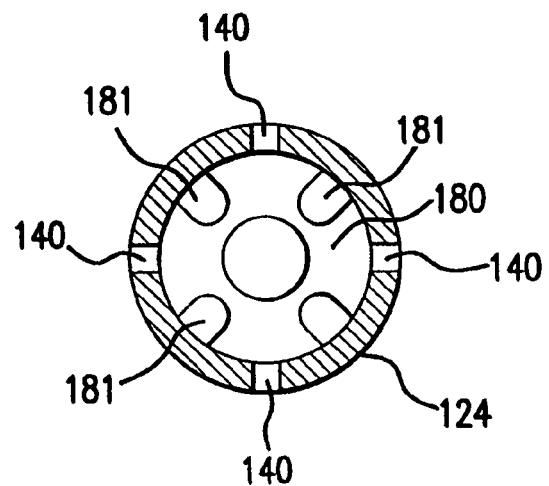
FIG. 7 is a partially in section, schematic drawing of the inflator shown in FIG. 6, taken substantially along the line 7—7 shown in FIG. 6.

Referring to FIGS. 4–7, the output control device 160 includes a rotor valve 180 positioned within the inner chamber 130 and operatively connected to a solenoid device 182. FIG. 4 generally represents the inflator 120 in a low rise rate (low mass flow rate) performance arrangement and FIG. 6 generally represents the inflator 120 in a high rise rate (high mass flow rate) performance arrangement. The solenoid device 182 is disposed or positioned relative to the rotor valve 180 and in operational control communication with the rotor valve 180 to effect rotational movement of the rotor valve 180 between a first or open position representing a low rise rate (low mass flow rate) performance arrangement (FIG. 5) and a second or closed position representing a high rise rate (high mass flow rate) performance arrangement (FIG. 7). With the rotor valve 180 in the open position, the rotor valve 180 generally provides a plurality of channels or slots 181 each corresponding with one of the plurality of first apertures 140 to allow fluidic communication between the outer chamber 128 and the inner chamber 130 through the first plurality of apertures 140, as well as through the second plurality of apertures 142, as shown in FIG. 4.

Upon activation of the solenoid device 182, the solenoid device 182 activates or causes the rotor valve 180 to rotate within inner chamber 130 and generally about axis A to the closed position wherein the channels 181 do not align with a corresponding one of the first plurality of apertures 140, as shown in FIG. 7, preventing or at least partially obstructing fluidic communication between the outer chamber 128 and the inner chamber 130 through at least one of the first plurality of apertures 140. The rotor valve 180 is selectively rotatable between the open position and the closed position to effect low mass flow rate or high mass flow rate as desired or commanded. Thus, the rotor valve 180 can repeatedly toggle or rotate between the open position and the closed position during deployment of the associated inflatable airbag cushion.

In the open position shown in FIGS. 4 and 5, actuation of the primary initiator 150 results in the passage of an initiating discharge into contact with the supply of gas-generating pyrotechnic material 145 contained within the outer chamber 128 to effect ignition of the supply of gas-generating pyrotechnic material 145. Such ignition will result in combustion of at least a portion of the supply of gas-generating pyrotechnic material 145 and an increase in pressure within the outer chamber 128. When the pressure within the outer chamber 128 is sufficiently increased, the barrier foil 143 adjacent to and covering each of the first plurality of apertures 140 and each of the second plurality of apertures 142 will rupture or otherwise open to permit passage therethrough of the combustion products. With such passage, the combustion products are passed into the inner chamber 130 and into contact with the cooling pack 137 therein contained, and subsequently out of the inflator 120 through one or more of the outer housing exit openings 136.

As shown in FIGS. 4 and 5, the rotor valve 180 is positioned such that flow through or out of the first plurality of apertures 140 and the second plurality of apertures 142 is generally uninterrupted or impeded by the rotor valve 180. Thus, when employing gas generant materials, e.g., pyrotechnics, which have or exhibit a relatively high burn rate pressure dependency, e.g., have a burn rate pressure exponent of 0.4 or more, such as identified above, such rotor valve positioning can desirably produce or result in reduced or lower mass flow rates of produced or formed gases, e.g., such performance arrangement produces or results in a "low rise rate" ("low mass flow rate") of inflation gas.

Turning now to FIGS. 6 and 7, the inflator 120 is now shown after actuation of the solenoid device 180 and the rotation of rotor valve 180 such that the rotor valve 180 is appropriately adjacent each of the first plurality of apertures 140 to cover, block or otherwise obstruct product gas passage through at least a portion of the first plurality of apertures 140, while the second plurality of apertures 142 remain open or otherwise unimpeded by the rotor valve 180. As shown in FIG. 7, channels 181 of the rotor valve 180 are no longer aligned with a corresponding one of the first plurality of apertures, thus generally impeding product gas flow through the first plurality of apertures 140.

Thus, as described above, the fluidic communication between the outer chamber 128 and the inner chamber 130 can be adjusted to result or produce in a higher or greater pressure within the outer chamber 128. Thus, when the invention is practiced employing gas generant materials which have or exhibit a relatively high burn rate pressure dependency, as described above, such higher combustion pressures can produce or result in higher mass flow rates of produced or formed gases. Consequently, such an arrangement constitutes what is termed herein as a "high rise rate" ("high mass flow rate") performance arrangement.

Thus, the inflator 120 is designed to permit and facilitate the adjustment of the fluidic communication between the outer chamber 128 and the inner chamber 130 in a manner which permits such adjustment once, twice, a selected plurality number of times or substantially continuously, as may be desired for particular inflation circumstances or installation requirements. Consequently, such as when the invention is practiced employing gas generant materials which have or exhibit the above-described burn rate pressure dependency, those skilled in the art and guided by the teachings herein provided will appreciate that the exit area of such inflator assemblies can be adjusted and controlled to provide particularly desired inflation performance characteristics, e.g., inflatable device rise rate.

As will be appreciated, the inflator 120 can upon proper actuation be subsequently returned to the state shown in FIG. 4. With such return, the fluidic communication between the outer chamber 128 and the inner chamber 130 through the first plurality of apertures is restored.

The primary initiator 150 is activated by a control assembly in operational control communication with the inflator 120. A suitable control assembly is described in detail below in reference to FIGS. 8 and 9. The control assembly provides a reaction initiating signal to the primary initiator 150 to initiate reaction of at least a portion of the said supply of gas-generating pyrotechnic material 145. The control assembly may also provide a control signal to effect movement of the output control device 160 between the open position allowing fluidic communication between the outer chamber 128 and the inner chamber 130 through the first plurality of apertures 140 and the second plurality of apertures 142, and the closed position at least partially obstructing fluidic communication between the outer chamber 128 and the inner chamber 130 through at least one of the first plurality of apertures 140. For example, the control assembly provides a control signal to the solenoid device 182 to effect rotation of the rotor valve 180 positioned within the inner chamber 130 from the open position (FIGS. 4 and 5) allowing fluidic communication between the outer chamber 128 and the inner chamber 130 through the first plurality of apertures 140, as well as through the second plurality of apertures 142, and a closed position (FIGS. 6 and 7) at least partially obstructing fluidic communication between the outer chamber 128 and the inner chamber 130 through at least one of the first plurality of apertures 140.

Figure 8:
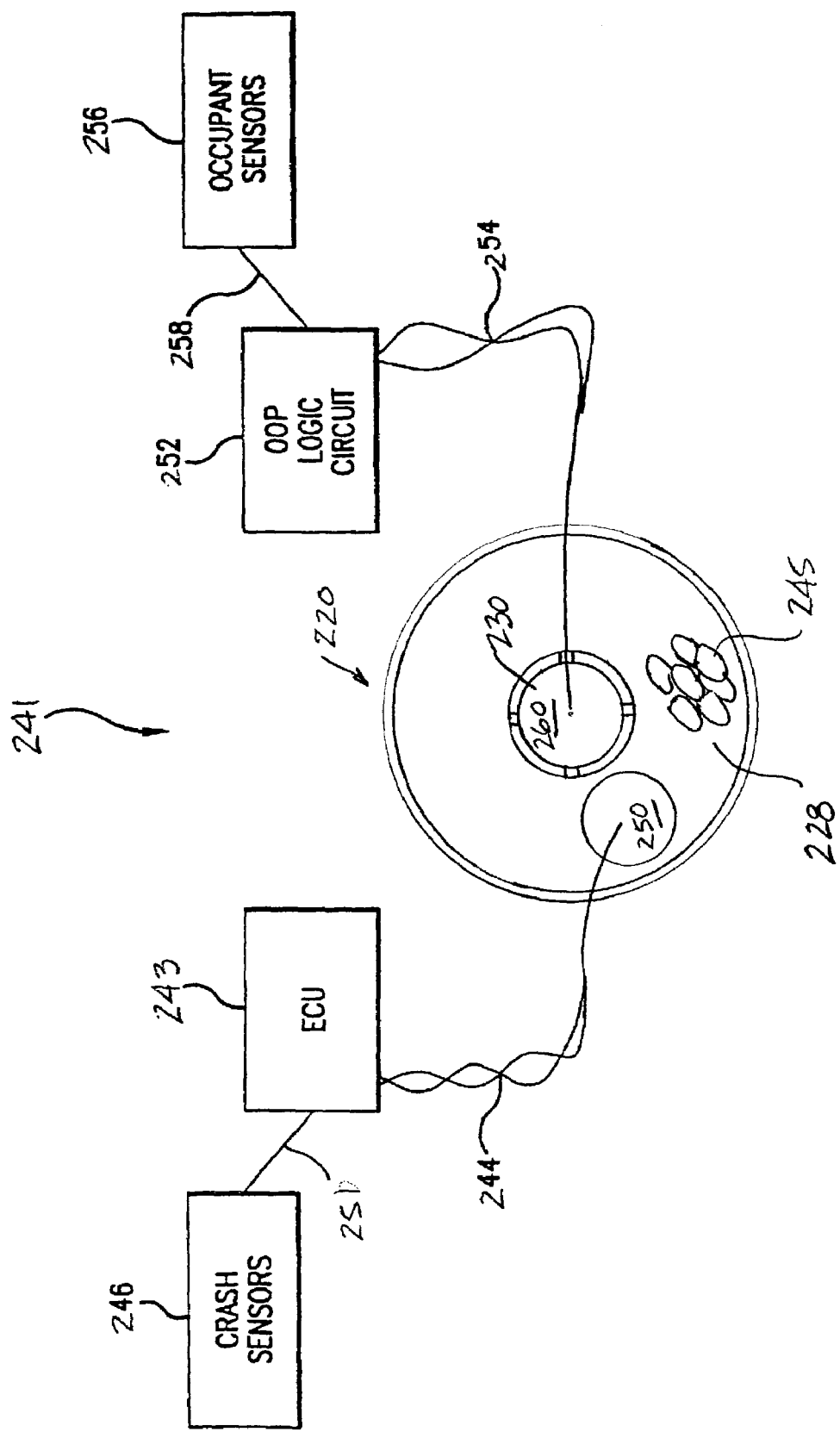
FIG. 8 is a simplified schematic illustrating an inflatable restraint system assembly in accordance with one preferred embodiment of the invention.

Various control arrangements can be employed in the practice of the invention. FIG. 8 is a simplified schematic illustrating an inflatable restraint system assembly 241 in accordance with one preferred embodiment of the invention and which incorporates an inflator 220 in accordance with the invention and such as described above. In addition to the inflator 220, the inflatable restraint system assembly 241 also includes an electronic control unit (ECU) 243 in control communication with the inflator 220 via electrical wiring 244 to the primary initiator 250.

The inflatable restraint system assembly 241 further includes one or more crash sensors 246. Crash sensors, such as know in the art, are available and are capable of sensing or detecting one or more selected parameters relating to the occurrence of a crash. For example, it is known to use a sudden or rapid vehicular deceleration as a crash occurrence parameter. As schematically shown in FIG. 8, the crash sensors 246 and the ECU 243 are in signal communication, as signified by the line 251.

As will be appreciated, in such an inflatable restraint system assembly, the ECU 243 can serve to signal and control if and when the primary initiator 250 is actuated and consequently if and when the inflator 220 is actuated to produce and discharge a desired inflation fluid. For example, upon receipt of a proper or appropriate signal from the crash sensors 246, the ECU 243 will signal or otherwise actuate the primary initiator 250 such as to effect reaction of the gas-generating pyrotechnic material 245 contained within the inflator 220 and the generation of the product gas thereby.

The inflatable restraint system assembly 241 also includes a logic circuit, herein designated an out-of-position (OOP) logic circuit and identified by the reference numeral 252, in control communication with the output control device 260, such as via the electrical wiring 254. For example, a common out-of-position logic circuit may be based on signal inputs such as whether an occupant is present or whether a seat belt is latched. To that end, the inflatable restraint system assembly 241 also includes occupant sensors 256, such as known in the art, in signal communication with the logic circuit 252, as signified by the line 258.

In the inflatable restraint assembly 241, the logic circuit 252 desirably serves to control when, e.g., under what circumstances, and if the output control device 260 is actuated and thus, an adjustment of the fluidic communication between the outer chamber 228 and the inner chamber 230 through which inflation fluid is discharged. As a result, the fluidic communication between the outer chamber 228 and the inner chamber 230 can be appropriately adjusted dependent on the specific selected circumstances associated with a particular inflatable restraint deployment situation. In one preferred embodiment of the invention, the output control device 260 includes the control initiator 70 in discharge communication with the control cup 65, as described above in reference to FIGS. 1–3. In an alternate preferred embodiment of the invention, the output control device 260 includes the rotor valve 180 operatively connected to the solenoid device 182, as described above in reference to FIGS. 4–7.

Figure 9:
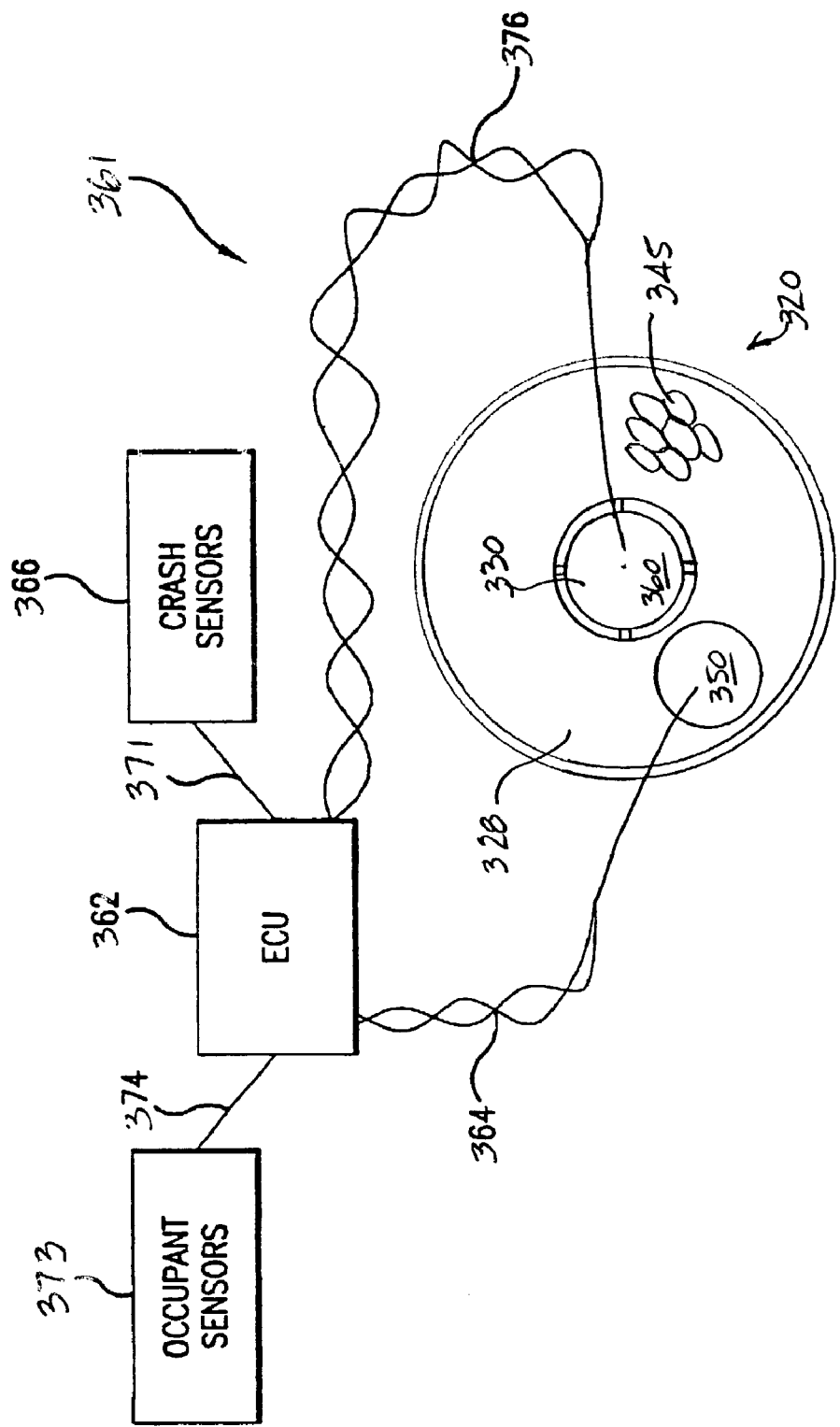
FIG. 9 is a simplified schematic illustrating an inflatable restraint system assembly in accordance with an alternative preferred embodiment of the invention.

FIG. 9 illustrates an inflatable restraint system assembly 361, in accordance with an alternate preferred embodiment of the invention. As described in greater detail below, the inflatable restraint system assembly 361 while having many similarities to the inflatable restraint system assembly 241 makes use of a single control unit to control both initiation of reaction of the supply of gas-generating pyrotechnic material 345 contained within the associated inflator 320 as well as adjustment of fluidic communication between the outer chamber 328 and the inner chamber 330 and thus the mass flow rate of product gas from the inflator 320.

For example, the inflatable restraint system assembly 361, similar to the inflatable restraint system assembly 241 described above, incorporates the inflator 320 and has an electronic control unit (ECU) 362 in control communication with the inflator 320 such as via electrical wiring 364 to the primary initiator 350. Also, similar to the inflatable restraint system assembly 241, the inflatable restraint system assembly 361 includes one or more crash sensors 366, such as known in the art, in signal communication with the ECU 362, as signified by the line 371.

The system assembly 361, however, also includes occupant sensors 373 in signal communication with the ECU 362, as signified by the line 374. The ECU 362, in turn, is joined or connected in control communication with the inflator 320 via electrical wiring 376 to the output control device 360.

As will be appreciated, the ECU 362 has the control logic capability to control both initiation of reaction of the gas-generating pyrotechnic material 345 contained within the associated inflator 320, such as via the actuation of the primary initiator 350, as well as adjustment of the fluidic communication within the inflator 320, such as via the appropriate actuation of the output control device 360. As a result, the fluidic communication between the outer chamber 328 and the inner chamber 330 can be appropriately adjusted dependent on the specific selected circumstances associated with a particular inflatable restraint deployment situation. In one preferred embodiment of the invention, the output control device 360 includes the control initiator 70 in discharge communication with the control cup 65, as described above in reference to FIGS. 1–3. In an alternate preferred embodiment of the invention, the output control device 360 includes the rotor valve 180 operatively connected to the solenoid device 182, as described above in reference to FIGS. 4–7.

While the invention has been described above with reference to the inflation of inflatable devices in the form of inflatable restraint airbag cushions, it will be appreciated that the broader practice of the invention is not necessarily so limited.

Thus, the invention provides a toroidal-shaped adaptive output inflator including an outer housing and an inner housing connected to the outer housing, together defining an outer chamber and an inner chamber. A supply of gas-generating pyrotechnic material having a burn rate that is pressure dependent is contained within the outer chamber. A primary initiator is in discharge communication with the outer chamber, and in operational initiation communication with the supply of gas-generating pyrotechnic material to initiate combustion of at least a portion of the supply of gas-generating pyrotechnic material to generate a product gas. A first plurality of apertures and a second plurality of apertures each formed in the inner housing provide independent fluidic communication between the outer chamber and the inner chamber through which the product gas can exit the outer chamber into the inner chamber. An output control device is positioned or disposed relative to the inner housing and movable between a first or open position allowing fluidic communication between the outer chamber and the inner chamber through the first plurality of apertures and the second plurality of apertures, and a second or closed position at least partially obstructing fluidic communication between the outer chamber and the inner chamber through at least one of the first plurality of apertures.

In one preferred embodiment of the invention, the output control device includes a control cup disposed relative to a control initiator with the control initiator in discharge communication with the control cup effective to move the control cup between the first position and the second position.

In an alternate preferred embodiment of the invention, the output control device includes a rotor valve operatively connected to a solenoid device and selectively rotatable between the open position and the closed position. Preferably, the rotor valve is repeatedly rotatable between the open position and the closed position during the deployment of an associated inflatable airbag cushion.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A toroidal-shaped adaptive output inflator comprising:
   an outer housing;
   an inner housing connected to said outer housing and together defining an outer chamber and an inner chamber;
   a supply of gas-generating pyrotechnic material having a burn rate that is pressure dependent contained within said outer chamber and wherein at least a portion of said supply of gas-generating pyrotechnic material is reactable to produce a product gas;
   a primary initiator in discharge communication with said outer chamber, and in operational initiation communication with said supply of gas-generating pyrotechnic material;
   a first plurality of apertures and a second plurality of apertures each formed in said inner housing, and each providing independent fluidic communication between said outer chamber and said inner chamber; and
   an output control device movable between a first position allowing fluidic communication between said outer chamber and said inner chamber through both said first plurality of apertures and said second plurality of apertures to form a low rise rate performance arrangement, and a second position at least partially obstructing fluidic communication between said outer chamber and said inner chamber through at least one of said first plurality of apertures to form a high rise rate performance arrangement having a rise rate greater than a rise rate of the low rise rate performance arrangement.

2. The toroidal-shaped adaptive output inflator of claim 1 further comprising a control initiator in discharge communication with said output control device effective to move said output control device between the first position and the second position.

3. The toroidal-shaped adaptive output inflator of claim 2 wherein said output control device includes a control cup disposed relative to said control initiator and moveable between the first position and the second position.

4. The toroidal-shaped adaptive output inflator of claim 1 wherein said first plurality of apertures and said second plurality of apertures each forms independent fluidic communication channels between said outer chamber and said inner chamber.

5. The toroidal-shaped adaptive output inflator of claim 1 wherein the pressure dependency of the burn rate of said supply of gas-generating pyrotechnical material is represented by n in a burn rate expression:

$$r_b = k(P)^n$$

where $r_b$ is a burn rate of the gas-generating pyrotechnic material, k is a constant, P is a combustion pressure, and n is a slope of a linear regression line drawn through a log-log plot of burn rate versus pressure, n has a valve of at least about 0.4.

6. The toroidal-shaped adaptive output inflator of claim 1 wherein said output control device includes a rotor valve selectively rotatable between the first position and the second position.

7. The toroidal-shaped adaptive output inflator of claim 6 wherein said rotor valve is operatively connected to a solenoid device.

8. The toroidal-shaped adaptive output inflator of claim 6 wherein said rotor valve is repeatedly rotatable between the first position and the second position.

9. The toroidal-shaped adaptive output inflator of claim 1 wherein said first plurality of apertures and said second plurality of apertures each are formed in a cylindrical wall formed by said inner housing.

10. The toroidal-shaped adaptive output inflator of claim 9 wherein said output control device is positioned within said inner chamber.

11. The toroidal-shaped adaptive output inflator of claim 9 wherein said cylindrical wall comprises at least one interfering projection limiting movement of said output control device in the second position.

12. A combination comprising:
    a toroidal-shaped adaptive output inflator including an outer housing and an inner housing, containing a supply of gas-generating pyrotechnic material having a burn rate that is pressure dependent reactable to produce a product gas, said inflator including a first plurality of apertures and a second plurality of apertures each providing independent fluidic communication between an outer chamber and an inner chamber defined within said inflator; and a control assembly in operational control communication with said inflator, and providing a reaction initiating signal to a primary initiator to initiate reaction of at least a portion of said supply of gas-generating pyrotechnic material and a control signal to effect movement of an output control device between a first position allowing fluidic communication between said outer chamber and said inner chamber through both said first plurality of apertures and said second plurality of apertures to form a low rise rate performance arrangement, and a second position at least partially obstructing fluidic communication between said outer chamber and said inner chamber through at least one of said first plurality of apertures to form a high rise rate performance arrangement having a rise rate greater than a rise rate of the low rise rate performance arrangement.

13. The combination of claim 12 wherein said output control device includes a control cup positioned within said inner chamber and moveable between the first position and the second position.

14. The combination of claim 12 wherein said output control device includes a rotor valve selectively rotatable between the first position and the second position.

15. The combination of claim 14 wherein said rotor valve is operatively connected to a solenoid device.

16. The combination of claim 14 wherein said rotor valve is repeatedly rotatable between the first position and the second position.

17. The combination of claim 12 wherein said control signal is provided to a control initiator to effect movement of a control cup between the first position and the second position.

18. The combination of claim 12 wherein said control signal is provided to a solenoid device to effect movement of a rotor valve between the first position and the second position.

19. A method for adaptively adjusting a mass flow rate of a product gas by controlling an internal combustion pressure in a toroidal-shaped inflator comprising an outer housing and an inner housing connected to the outer housing and together defining an outer chamber and an inner chamber, and a supply of gas-generating pyrotechnic material contained within the outer chamber having a burn rate that is pressure dependent, at least a portion of the supply of gas-generating pyrotechnic material reactable to produce the product gas, the method comprising:

at least partially selectively obstructing fluidic communication between the outer chamber and the inner chamber through at least one of a first plurality of apertures and a second plurality of apertures each formed in the inner housing, and each providing independent fluidic communication between the outer chamber and the inner chamber, an output control device movable between a first position allowing fluidic communication between said outer chamber and said inner chamber through both said first plurality of apertures and said second plurality of apertures forming a low rise rate performance arrangement, and a second position at least partially obstructing fluidic communication between said outer chamber and said inner chamber through at least one of said first plurality of apertures forming a high rise rate performance arrangement having a rise rate greater than a rise rate of the low rise rate performance arrangement.

20. The method of claim 19 wherein the control device includes a control cup disposed relative to a control initiator and moveable between the first position and the second position.

21. The method of claim 19 wherein the control device includes a rotor valve selectively rotatable between the first and the second position.

22. The method of claim 21 wherein said rotor value is operatively connected to a solenoid device.

* * * * *